(No Model.)

A. COWART.
CULTIVATOR.

No. 488,270. Patented Dec. 20, 1892.

Witnesses.
A. Ruppert,
H. A. Daniels,

Inventor.
Adolphus Cowart,
Per
Thomas P. Simpson,
Atty.

UNITED STATES PATENT OFFICE.

ADOLPHUS COWART, OF JUDSON, ALABAMA.

CULTIVATOR.

SPECIFICATION forming part of Letters Patent No. 488,270, dated December 20, 1892.

Application filed May 31, 1892. Serial No. 434,845. (No model.)

*To all whom it may concern:*

Be it known that I, ADOLPHUS COWART, a citizen of the United States, residing at Judson, in the county of Chambers and State of Alabama, have invented certain new and useful Improvements in Cultivators; and I do hereby declare the following to be a full, clear, and exact description of the invention, such as will enable others skilled in the art to which it appertains to make and use the same.

The special object of the invention is to make a frame which is readily convertible into a V-shaped cultivator with the angle at front or rear, into a straddle-row cultivator, into a three-toothed right-hand side-harrow or left-hand side-harrow, the said frame being thus adapted to be used for fine implements which are usually separate.

Figure 1:
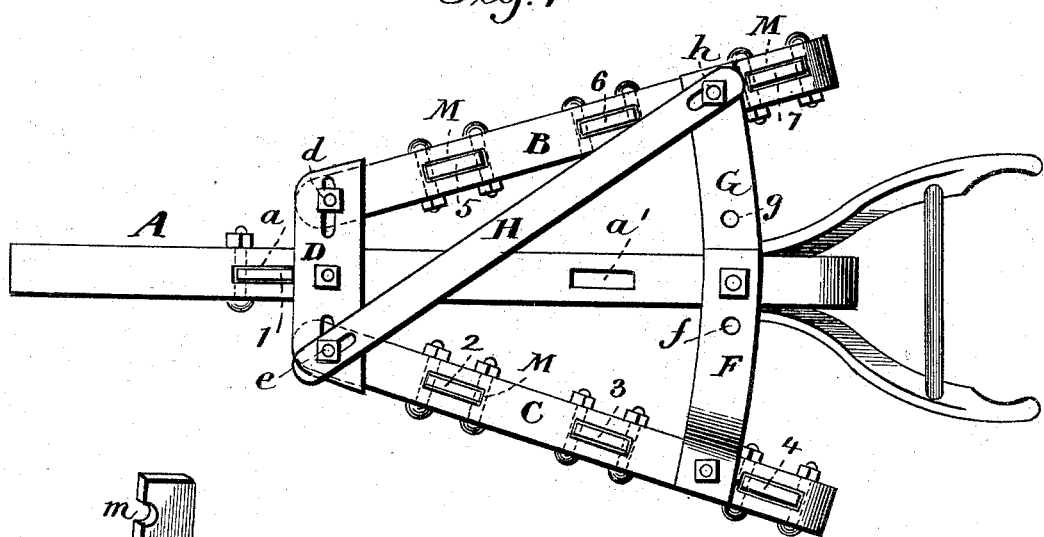
Figure 3:
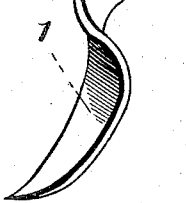
Figure 2:
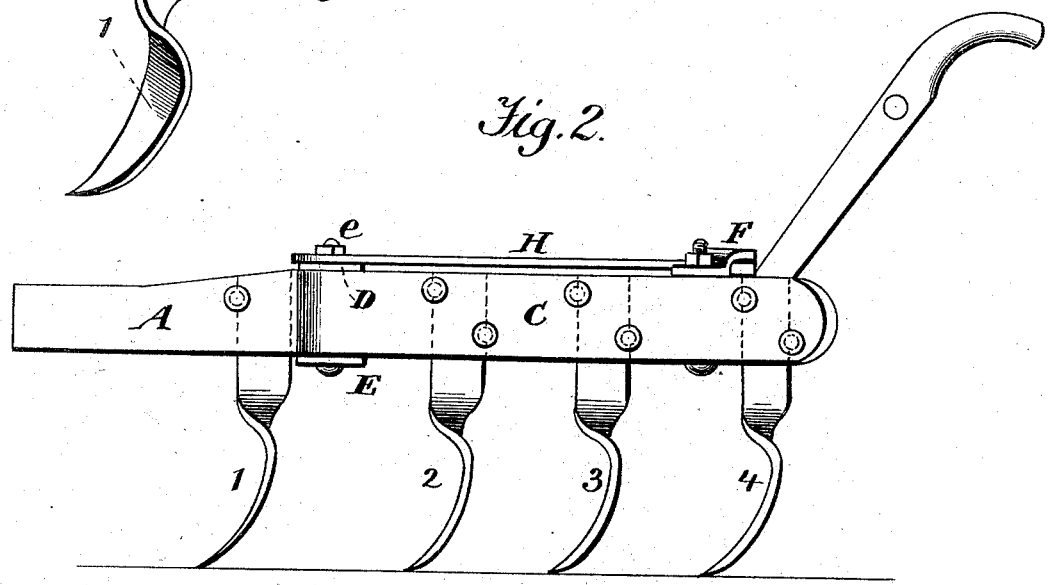

Figure 1 of the drawings is a plan view, Fig. 2 a side-elevation, and Fig. 3 a detail view of the harrow tooth.

In the drawings, A represents the draft-beam provided with the vertical slots $a$ $a'$ in which are received the shank of tooth, one only being used at a time.

B C are corresponding wings which are placed at an angle of greater or less degree to the draft-beam whose central position is never changed. The beam has in front the tooth 1 while the left wing and right wing carry three teeth apiece arranged in echelon or in a diagonal line with No. 1.

D E are top and bottom brace plates slotted near each end and shown in drawings on the front of cultivator. These are held to the wings by the bolts $d$ $e$ carrying nuts on their ends.

F G are corresponding brace-plates shown on the rear of frame and provided at their interlapping ends with a series of holes $f$, $g$, while H is a diagonal brace slotted near each end to receive bolts $h$ for holding it adjustably by nuts in any desired position. M represent the mortises in the wings for the teeth and $m$ the notches in the teeth by which the bolts hold them securely as desired. Thus it will be seen that the wings may be closed more or less and the brace H shortened or lengthened to correspond. The teeth 1, 2, 3, 4, 5, 6, 7 are given a quarter twist right and left within about four inches of the point, and provided with notches $m$ in the shank so that they will be firmly retained in place by the bolts and not drop or be pulled out.

As shown in Fig. 1 of the drawings, the frame forms with the teeth a V-harrow or cultivator with the angle in front. By placing the plates D E behind and F G in front with the tooth 1 in the slot $a'$, it is converted into a V-harrow with the angle at the rear. By taking the frame as shown in Fig. 1 of the drawings and closing the wings, a covering harrow is formed to throw loose dirt over the seed—the tooth 1 being removed. Again, taking the frame and teeth as shown in Fig. 1 of the drawings and moving tooth 1 to slot $a'$, remove teeth 3, 4 and 6, 7. This gives a three-toothed right hand side-harrow, while a reversed three-toothed harrow is formed by removing teeth 5, 2 and substituting the teeth 7, 4.

Having thus described the invention, what I claim as new and desire to protect by Letters Patent is:

The combination of the draft-beam A having the slots $a$ $a'$ for teeth, the wings B C, the plates D E slotted near their ends, the plates F G having a series of holes near their interlapping ends, the bar H slotted near the ends and the teeth 1, 2, 3, 4, 5, 6, 7; whereby may be conveniently formed six different harrows or cultivators for special use at different stages of growth in the crops as described.

In testimony whereof I affix my signature in presence of two witnesses.

ADOLPHUS COWART.

Witnesses:
A. H. HOWES,
W. B. CHATFIELD.